(12) United States Patent
Cherkasova et al.

(10) Patent No.: US 9,298,563 B2
(45) Date of Patent: Mar. 29, 2016

(54) CHANGING A NUMBER OF DISK AGENTS TO BACKUP OBJECTS TO A STORAGE DEVICE

(75) Inventors: Ludmila Cherkasova, Sunnyvale, CA (US); Roger K. T. Lau, Sunnyvale, CA (US); Subramaniam Venkata Kaiambur, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 1100 days.

(21) Appl. No.: 12/791,263

(22) Filed: Jun. 1, 2010

(65) Prior Publication Data

US 2011/0295811 A1    Dec. 1, 2011

(51) Int. Cl.
*G06F 17/30* (2006.01)
*G06F 11/14* (2006.01)
*G06F 11/34* (2006.01)

(52) U.S. Cl.
CPC ........ *G06F 11/1464* (2013.01); *G06F 11/1461* (2013.01); *G06F 11/3419* (2013.01); *G06F 11/3457* (2013.01); *G06F 17/30073* (2013.01); *G06F 11/1456* (2013.01); *G06F 2201/865* (2013.01); *G06F 2201/88* (2013.01)

(58) Field of Classification Search
CPC ............ G06F 17/5009; G06F 11/1461; G06F 11/3419; G06F 11/1458; G06F 17/30159
USPC ...................................... 707/654; 718/1–108
See application file for complete search history.

(56) References Cited

U.S. PATENT DOCUMENTS

| | | | |
|---|---|---|---|
| 6,675,177 B1 * | 1/2004 | Webb | |
| 6,934,724 B1 * | 8/2005 | Deshayes et al. | |
| 7,159,218 B2 | 1/2007 | Abe et al. | |
| 7,401,194 B2 * | 7/2008 | Jewell | 711/162 |
| 7,461,201 B2 | 12/2008 | Amano et al. | |
| 7,568,124 B2 | 7/2009 | Ali et al. | |
| 7,596,713 B2 | 9/2009 | Mani-Meitav et al. | |
| 7,930,559 B1 * | 4/2011 | Beaverson et al. | 713/193 |
| 2007/0159974 A1 | 7/2007 | Fabbri et al. | |
| 2008/0154914 A1 | 6/2008 | Kan et al. | |
| 2008/0244601 A1 * | 10/2008 | Zeis et al. | 718/104 |
| 2008/0263551 A1 | 10/2008 | Ali et al. | |
| 2009/0210878 A1 | 8/2009 | Huang | |
| 2009/0292888 A1 | 11/2009 | Srivastava et al. | |
| 2009/0300633 A1 * | 12/2009 | Altrichter et al. | 718/103 |
| 2009/0307283 A1 * | 12/2009 | Lehr et al. | 707/204 |

OTHER PUBLICATIONS

Randal C. Burns et al, Efficient Distributed Backup with Delta Compression (Research Paper), Retrieved Dec. 2, 2015, 11 Pages.

* cited by examiner

*Primary Examiner* — Michelle Owyang
(74) *Attorney, Agent, or Firm* — Law Office of Philip Scott Lyren

(57) ABSTRACT

A method executes a simulation to determine backup times to backup objects to storage devices using a number of concurrent disk agents that are assigned to each of the storage devices. The number of concurrent disk agents is changed during the backup of the objects to the storage devices.

19 Claims, 10 Drawing Sheets

300

Pseudo Code for FlexLBF Algorithm

Assigning resources to a job
For top job $J_j = (O_j, Dur_j, Tput_j)$ in OrdObjList do
   if (!Blocked AND $\exists ActDA_i$ < maxDA)
     TapeAggTput$_m$ =
minActDA$_i$<maxDA(TapeAggTput$_i$)
      if (TapeAggTput$_m$ + Tput$_j$ ≤ maxTput)
        assign jobJ$_i$ for backup processing to Tape$_m$
        ActDA$_m$ $\Leftarrow$ ActDA$_m$ + 1
        TapeAggTput$_m$ $\Leftarrow$ TapeAggTput$_m$ + Tput$_j$
        remove job J$_j$ from OrdObjList
      else // not enough resources for processing job J$_j$
        Blocked $\Leftarrow$ 1 //job J$_j$ assignment is blocked
          until some earlier job is completed
   else
     Blocked $\Leftarrow$ 1
Releasing resources when a job is completed
If backup processing of job Jk is completed by Tape$_i$
   ActDA$_i$ $\Leftarrow$ ActDA$_i$ − 1
   TapeAggTput$_i$ $\Leftarrow$ TapeAggTput$_i$ − Tput$_i$
   Blocked $\Leftarrow$ 0

Pseudo Code for LBF Algorithm

Assigning resources to a job
For top job $J_j = (O_j, Dur_j)$ in OrdObjList do
    if (!Blocked AND $\exists ActDA_i < k$)
        TapeProcTime$_m$ = minActDA$_i$<k(TapeProcTime$_i$)
        assign job Ji for backup processing to Tape$_m$
        ActDA$_m$ $\Leftarrow$ ActDA$_m$ + 1
        TapeProcTime$_m$ $\Leftarrow$ TapeProcTime$_m$ + Dur$_j$
        remove job $J_j$ from OrdObjList
    else // no available disk agents for processing job $J_j$
        Blocked $\Leftarrow$ 1 //job $J_j$ assignment is blocked
                until some earlier job is completed
Releasing resources when a job is completed
If backup processing of job Jk is completed by Tape$_i$
    ActDA$_i$ $\Leftarrow$ ActDA$_i$ − 1
Blocked $\Leftarrow$ 0

| Backup Server | Absolute and Relative Reduction of the Overall Backup Time | | |
|---|---|---|---|
| | Week 1 | Week 2 | Week 3 |
| Server 1 | 671 min (26%) | 640 min (25%) | 675 min (25%) |
| Server 2 | 415 min (29%) | 371 min (29%) | 444 min (34%) |
| Server 3 | 314 min (15%) | 302 min (15%) | 289 min (14%) |
| Server 4 | 164 min (18%) | 168 min (18%) | 192 min (20%) |
| Server 5 | 121 min (20%) | 139 min (23%) | 126 min (21%) |
| Server 6 | 271 min (19%) | 298 min (19%) | 310 min (20%) |
| Server 7 | 118 min (24%) | 135 min (26%) | 141 min (25%) |
| Server 8 | 277 min (25%) | 249 min (24%) | 213 min (23%) |

|  | Configuration Parameters | | | |
|---|---|---|---|---|
|  | Optimal Backup Time | | Within 15% of Optimal | |
| Backup Server | NumDrives | maxDA | NumDrives | maxDA |
| Server 1 | 2 | 4 | 1 | 7 |
| Server 2 | 1 | 10 | 1 | 6 |
| Server 3 | 2 | 5 | 1 | 9 |
| Server 4 | 1 | 9 | 1 | 8 |
| Server 5 | 1 | 7 | 1 | 7 |
| Server 6 | 2 | 5 | 2 | 4 |
| Server 7 | 1 | 7 | 1 | 6 |
| Server 8 | 2 | 4 | 1 | 5 |

FIG. 9

CHANGING A NUMBER OF DISK AGENTS TO BACKUP OBJECTS TO A STORAGE DEVICE

BACKGROUND

Unstructured data is a large and fast growing portion of assets for companies and often represents 70% to 80% of online data. Analyzing and managing this unstructured data is a high priority for many companies. Further, as companies implement enterprise-wide content management (such as information classification and enterprise search) and as the volume of data in the enterprises continues to increase, establishing a data management strategy becomes more challenging.

Backup management also faces challenges to manage large amounts of unstructured data. Backup systems are required to process increasing amounts of data while meeting time constraints of backup windows.

BRIEF DESCRIPTION OF THE DRAWINGS

FIG. 3 shows pseudo-code for a FlexLBF algorithm in accordance with an example embodiment.

FIG. 4 shows pseudo-code for an LBF algorithm in accordance with an example embodiment.

FIG. 5 shows a table depicting reduction in backup times when an LBF algorithm is used to backup data in accordance with an example embodiment.

FIG. 9 shows a table of configuration parameters for eight servers in accordance with an example embodiment.

DETAILED DESCRIPTION

Figure 1:
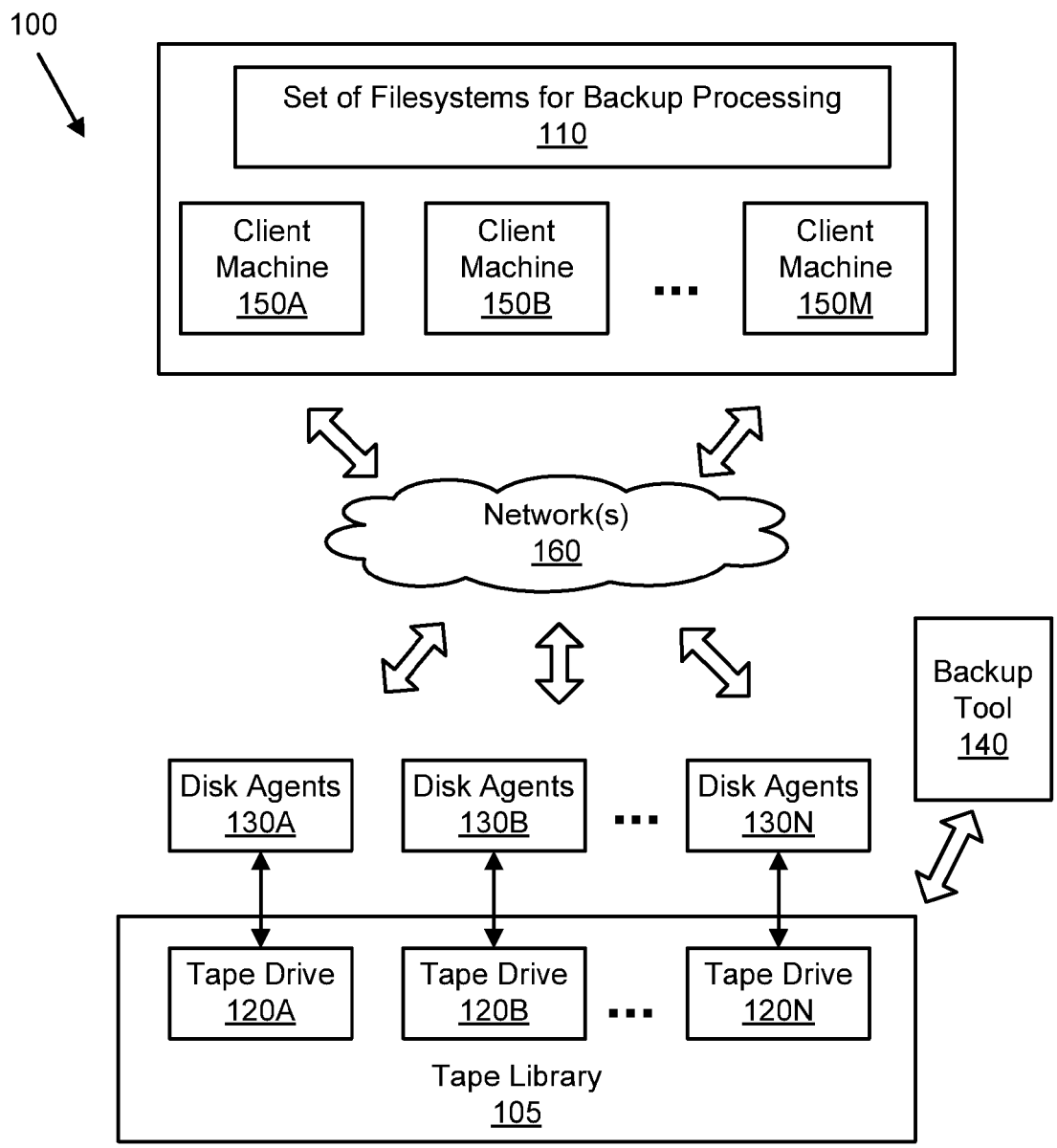
FIG. 1 shows a storage system with a tape library backing up filesystems to tape drives in accordance with an example embodiment.

Example embodiments relates to systems and methods that backup data from one or more servers to storage devices using multiple concurrent processes (called disk agents).

One embodiment analyzes historic data on backup processing from multiple backup servers and uses two metrics (job duration and job throughput) to minimize the overall completion time for a given set of backup jobs. A job scheduling algorithm (called FlexLBF) utilizes extracted information from historic data and provides a reduction in the backup time (up to 50%), improves quality of service, and reduces resource usage (up to 2-3 times). Under this scheduling, the longest backup jobs are scheduled first, and the number of jobs is processed concurrently. The proposed framework reduces error-prone manual processes and avoids manual configuration and parameter tuning efforts by system administrators.

One embodiment tracks and stores metadata for multiple backup periods. This metadata provides data points for deriving metadata analysis and trending. For each backed up object (which represents a mount point or a filesystem), there is recorded information on the number of processed files, the total number of transferred bytes, and the elapsed backup processing time. Example embodiments analyze this information to increase efficiencies in backing up data and optimizing run-time performance of future backups.

Some backup tool have a configuration parameter that defines a level of concurrency, i.e., a fixed number of concurrent processes (called disk agents) that can backup different objects in parallel to the tape drives. This is done because a single data stream generated by a disk agent cannot fully utilize the capacity/bandwidth of the backup tape drive due to slower client machines. As such, system administrators perform a set of manual tests to determine a correct value of this parameter in their environment. This value depends on both the available network bandwidth and the input/output (I/O) throughput of the client machines. Moreover, when configuring the backup tool, a system administrator considers (1) optimizing the backup tape drive throughput by enabling a higher number of concurrent disk agents, and (2) optimizing the data restore time by avoiding excessive data interleaving (i.e., trying to limit the number of concurrent disk agents). It is difficult to select a fixed number of disk agents which is optimal for achieving both goals. Random job scheduling also poses a potential problem for backup tools. When a group of N objects is scheduled for processing, it is difficult to define a sequence or an order in which these objects should be processed by the tool. If a large (or slow) object with a long backup time is selected significantly later in the backup session this leads to an inefficient schedule and an increased overall backup time.

Example embodiments use two metrics (job duration and job throughput) to characterize the time duration to complete the backup job and the average throughput (MB/s) of this backup job during the backup session. Analysis of backup job durations and throughputs from multiple backup servers reveals that the past measurements of backup time and throughput of the same object are quite stable over time. Therefore, this historic information is used for more efficient backup scheduling in order to minimize the overall backup completion in the future backups. This problem can be formulated as a resource constrained scheduling problem where a set of N jobs are scheduled on M machines with given capacities. Each job J is defined by a pair of attributes (length, width). At any time, each machine can process arbitrary many jobs in parallel but the total width of these jobs does not exceed the capacity of the machine. The objective functions are to find a schedule that minimizes the processing makespan or the overall completion time for a given set of jobs.

With the FlexLBF algorithm, the longest backups are scheduled first, and a flexible number of concurrent jobs are processed over time. By using the observed average throughput per object from the past measurements and the maximum data rates that can be processed by the tape drives, example embodiments vary the number of concurrent objects assigned per tape drive during a backup process in order to optimize both the overall backup time and the tape drive utilization during the backup session.

The functionality of a backup tool is built around a backup session and the objects (mount points or filesystems of the client machines) that are backed up during the session. FIG. 1 shows a storage system 100 that includes tape library 105 using a backup tool or software application 140. The library backs up a set of objects or filesystems 110 to storage devices, such as tape drives (shown as 120A, 120B, to 120N) using multiple disk agents (shown as 130A, 130B, to 130N). The backup tool 140 manages the backup of the filesystems to the tape drives. A plurality of client machines, hosts, or servers (shown as 150A, 150B, to 150M) communicates with the library 105 through one or more networks 160.

For illustration, assume there are 4 to 6 tape drives, and each such tape drive has a configuration parameter that defines a concurrency level (i.e., a number of concurrent processes called disk agents, DAs) that backup different objects parallel to the tape drives. Traditionally, this is performed because a single data stream generated by a disk agent copying data from a single object cannot fully utilize the capacity/bandwidth of the backup tape drive due to slow client machines. To optimize the total backup throughput, a system administrator can configure up to 32 disk agents for each tape drive to enable concurrent data streams from different objects at the same time. The drawback of such an approach is that the data streams from 32 different objects are interleaved on the tape. When the data of a particular object is requested to be restored, there is a higher restoration time for retrieving such data compared with a continuous, non-interleaved data stream written by a single disk agent.

When a group of N objects is assigned to be processed by the backup tool, a sequence or order cannot be defined in which these objects are processed by the tool. Typically, any available disk agent is assigned for processing to any object from the set, and the objects (which might represent different mount points of the same client machine) is written to different tape drives. Thus, traditionally, a way does not exist to define an order in which the objects are processed by concurrent disk agents to the different tape drives. Potentially, this may lead to inefficient backup processing and an increased backup time.

Figure 2A:
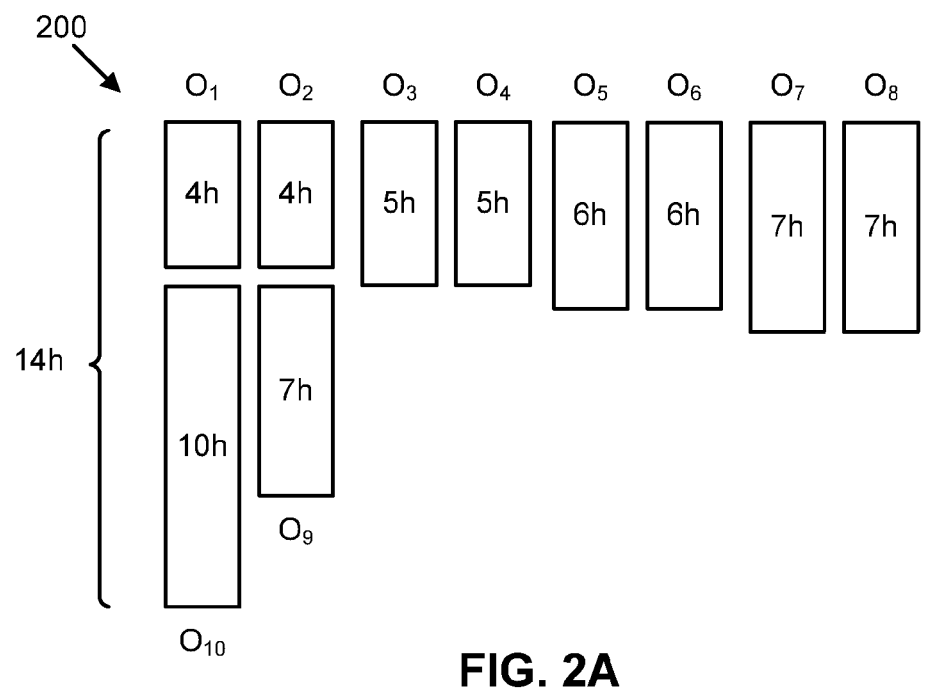
FIG. 2A shows a graph of profiles of filesystems backed-up over time in accordance with an example embodiment.

The following scenario illustrates this inefficiency. Let there be ten objects $O_1, O_2, \ldots, O_{10}$, in a backup set, and let the backup tool have four tape drives each configured with 2 concurrent disk agents (i.e., with eight disk agents in the system). Let these objects take approximately the following times for their backup processing: $T_1=T_2=4$ hours, $T_3=T_4=5$ hours, $T_5=T_6=6$ hours, $T_7=T_8=T_9=7$ hours, and $T_{10}=10$ hours. If the disk agents randomly select the following eight objects, $O_1, O_2, O_3, \ldots, O_7, O_8$, for initial backup processing then objects $O_9$ and $O_{10}$ will be processed after the backup of $O_1$ and $O_2$ are completed (since backup of $O_1$ and $O_2$ take the shortest time of 4 hours), and the disk agents which became available will then process $O_9$ and $O_{10}$. In this case, the overall backup time for the entire group will be 14 hours. FIG. 2A shows blocks of backup times 200 for filesystems or objects with random scheduling in accordance with this scenario.

Figure 2B:
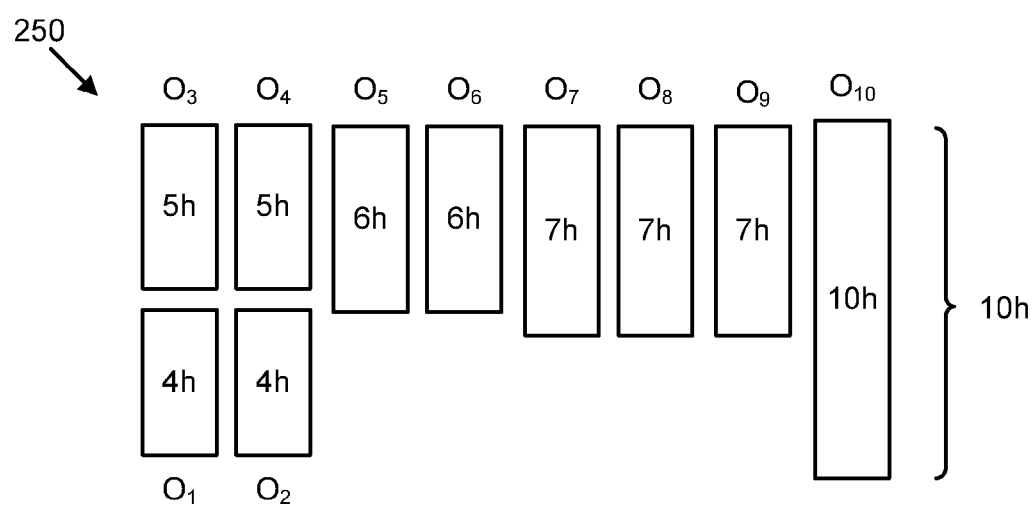
FIG. 2B shows another graph of profiles of the filesystems backed-up over time in accordance with an example embodiment.

The optimal scheduling for this group is to process the following eight objects instead: $O_3, O_4, \ldots, O_{10}$ first, and when processing of $O_3$ and $O_4$ is completed after 5 hours, the corresponding disk agents will backup the remaining objects $O_1$ and $O_2$. If the object processing follows this new ordering schema then the overall backup time is 10 hours for the entire group. FIG. 2B shows blocks of backup times 250 for filesystems with optimized scheduling using LBF.

When configuring the backup tool, a system administrator attempts to optimize the backup throughput by enabling a higher number of concurrent disk agents while at the same time optimize the data restore time by avoiding excessive data interleaving (i.e., limiting the number of concurrent DAs). In other words, on one hand, a system administrator determines the number of concurrent disk agents that are able to utilize the capacity/bandwidth of the backup tape drive. On the other hand, the system administrator should not over-estimate the required number of concurrent disk agents because the data streams from these concurrent agents are interleaved on the tape. When the data of a particular object is restored there is a higher restoration time for retrieving such data compared with a continuous, non-interleaved data stream written by a single disk agent. Moreover, when the aggregate throughput of concurrent streams exceeds the specified tape drive throughput, it may increase the overall backup time instead of decreasing it. Often the backup time of a large object dominates the overall backup time. Too many concurrent data streams written at the same time to the tape drive decreases the effective throughput of each stream, and therefore, unintentionally increases the backup time of large objects and results in the overall backup time increase.

As discussed more fully below, one embodiment adaptively changes the number of active disk agents at each tape drive during the backup session to maximize the system throughput and minimize or decrease the backup time.

A software backup tool records information while data of the object is processed during a backup session. For each backed up object, information is recorded on the number of processed files, the total number of transferred bytes, and the elapsed backup processing time. One embodiment also records an additional metric (called job throughput) that characterizes the average throughput (MB/s) achieved for the object during the backup session. In one example embodiment, this metric is defined as follows:

$$\text{job\_throughput} = (\text{job\_transferred bytes})/(\text{job\_processing time}).$$

Thus, backup jobs are characterized by metrics that include job processing time and job throughput.

One embodiment analyzes historic data from multiple backup servers. In analyzing this data, a determination is made that past measurements of backup processing time and job average throughput are good predictors of the future backup processing characteristics. This analysis also shows that past measurements can be used for future backup job assignment and scheduling processes.

In one study, six hundred and eighty two objects (i.e., user filesystems) were backed up by the eight backup servers. The study followed the distribution of object durations in the set over three consecutive weeks and showed that the backup duration of the same object is quite stable over time.

In this study, a determination was also made about the stability of job throughputs over time, and how much diversity one can observe in the job throughputs during a single session. The study showed that the job throughput of the same object is quite stable over time (especially when compared to the mean throughput over the same time) even with significant diversity in observed job throughputs (e.g., from 0.1 MB/s to 35 MB/s).

In the study, the backup servers were placed next to high-level networking switches. This way, any client machine is 1-2 hops away from the backup servers and can be assigned for service to any of them. In this configuration, the backup throughput depends on the I/O throughput of the client machine and is less impacted by the network conditions.

The following example illustrates the FlexLBF scheduling algorithm. Let us consider a backup tool with N tape drives: $Tape_1, \ldots, Tape_N$. Under the traditional architecture, there is a configuration parameter k that defines the fixed concurrency level, i.e., a fixed number of concurrent disk agents (DAs) that can backup different objects in parallel to the tape drives. One embodiment investigates the backup tool architecture where tape drives can have a variable number of concurrent DAs defined by one or more of the following parameters:
   (1) maxDA: This represents the limit on the maximum number of concurrent disk agents that can be assigned per tape (one can consider different limits for different tape drives).
   (2) maxTput: This represents the aggregate throughput of the tape drive (each tape library is homogeneous, but there could be different generation tape libraries in the overall set).

The following running counters per a tape drive are as follows:
   (1) $ActDA_i$: This represents the number of active (busy) disk agents of tape drive $Tape_i$ (initialized as $ActDA_i=0$).
   (2) $TapeAggTput_i$: This represents the aggregate throughput of the currently assigned objects (jobs) to tape drive $Tape_i$ (initialized as $TapeAggTput_i=0$).

Each job $J_j$ in the future backup session is represented by a tuple: $(O_j, Dur_j, Tput_j)$, where
   $O_j$ is the name of the object;
   $Dur_j$ denotes the backup duration of object $O_j$ observed from the previous full backup; and
   $Tput_j$ denotes the throughput of object $O_j$ computed as a mean of the last k throughput measurements.

Once we have historic information about all the objects, an ordered list of objects OrdObjList (sorted in decreasing order of their backup durations) is created:

$$OrdObjList=\{(O_1,Dur_1,Tput_1), \ldots, (O_n,Dur_n,Tput_n)\}$$

where $Dur_1 \geq Dur_2 \geq Dur_3 \geq \ldots \geq Dur_n$.

The FlexLBF scheduler operates as follows:
Let $J_j=(O_j,Dur_j,Tput_j)$ be the top object in OrdObjList. Let tape drive $Tape_m$ have an available disk agent and $$TapeAggTput_m = \min_{ActDA_i < maxDA} (TapeAggTput_i),$$

i.e., $Tape_m$ is among the tape drives with an available disk agent, and $Tape_m$ has the smallest aggregate throughput.

Job $J_j$ is assigned to $Tape_m$ if its assignment does not violate the maximum aggregate throughput specified per a tape drive, i.e., if the following condition is true:

$$TapeAggTput_m + Tput_j \leq maxTput.$$

If this condition holds then object $O_j$ is assigned to $Tape_m$, and the tape drive running counters are updated as follows:

$$ActDA_m \Leftarrow ActDA_m+1,$$

$$TapeAggTput_m \Leftarrow TapeAggTput_m + Tput_j$$

Otherwise, job $J_j$ cannot be scheduled at this step, and the assignment process is blocked until some earlier scheduled jobs are completed and the additional resources are released.

Intuitively, under the FlexLBF algorithm, the longest jobs are processed first. Each next object is considered for the assignment to a tape drive with the largest available space to the tape drive: 1) with an available DA; 2) the smallest assigned aggregate throughput (i.e., the largest available "space"), and 3) the condition that the assignment of this new job does not violate the tape drive throughput maxTput, i.e., the current job fits to the available space.

When the earlier scheduled job $J_k$ is completed at the tape drive $Tape_m$, the occupied resources are released and the running counters of this tape drive are updated as follows:

$$ActDA_m \Leftarrow ActDA_m-1,$$

$$TapeAggTput_m \Leftarrow TapeAggTput_m - Tput_k.$$

FIG. 3 shows the pseudo-code 300 for the FlexLBF algorithm.

One embodiment uses historic information about prior object backup processing times and generates a job scheduling that reduces an overall time to backup data. Under this scheduling, the longest backups (the objects with longest backup time) are scheduled first (referred to herein as longest backups first or LBF).

An LBF job scheduler augments the traditional backup solution with a fixed number of concurrent DAs, i.e., with a constant number of active DAs per a tape drive during a backup session.

We observe the following running counters per a tape drive:
   (1) $ActDA_i$: This represents the number of active (busy) disk agents of tape drive $Tape_i$ (initialized as $ActDA_i=0$).
   (2) $TapeProcTime_i$: This represents the overall processing time of all the objects that have been assigned to $Tape_i$ during the current session (initialized as $TapeProcTime_i=0$).

Each job $J_j$ in the future backup session is represented by a tuple: $(O_j, Dur_j)$, where $Dur_j$ denotes the backup duration of object $O_j$ observed from the previous full backup. The LBF scheduler uses an ordered list of objects sorted in decreasing order of their backup durations: $OrdObjList=\{(O_1, Dur_1), \ldots, (O_n, Dur_n)\}$ where $Dur_1 \geq Dur_2 \geq Dur_3 \geq \ldots \geq Dur_n$.

Under the LBF algorithm, the longest jobs are processed first. In addition, the job assignment process attempts to load balance the overall amount of processing time assigned to different tape drives. Typically, each tape drive concurrently processes a constant number of k jobs.

FIG. 4 shows the pseudo-code 400 of the LBF algorithm.

The FlexLBF scheduling algorithm was evaluated using historic information on the duration and throughput of backup jobs collected from eight backup servers with jobs having throughputs above 20 MB/s. The backup servers have four tape drives (with maximum data rate of 80 MB/s), each configured with four concurrent disk agents.

If we apply the LBF scheduling to the backup servers in the default configuration described above (i.e., 4 tape drives with 4 concurrent disk agents) we do get backup time reduction across all the eight servers. The time reduction is 40 minutes to 212 minutes, and the relative time reduction is 10%-30%. The resulting overall backup time (for all the eight servers in the study) is limited by the duration of the longest backup job at the corresponding server, and hence it is optimal, and cannot be improved further in the considered configuration.

In order to demonstrate the benefits of the new FlexLBF scheduler, we take the same workload and compare its backup processing under different schedulers using a single tape drive (instead of 4 tape drives in the default configuration).

To set a base line for the comparison, we first process given workloads using random and LBF scheduling and the traditional tool architecture configured with a single tape drive and a fixed number of four concurrent disk agents per tape. Table 500 in FIG. 5 shows absolute and relative reduction in the overall backup times when the proposed LBF scheduling algorithm is used instead of the traditional (random) job scheduler for eight backup servers under study.

First of all, significant time savings are achieved across all the eight backup servers when using the LBF job scheduling compared to the traditional one. The absolute time savings range from 121 min to 415 min. These results are consistent for the three consecutive weeks used in the study, as shown in table 500. The relative performance benefits and reduction in the backup time (14%-34%) depends on the size distribution of objects the backup server is responsible for.

Next, we compare the outcome of backup processing under the LBF scheduler versus the FlexLBF scheduler for the eight backup servers under study. The backup servers under the FlexLBF scheduler are configured with a single tape drive and the following parameters:
(1) maxDA=10, i.e., no more than 10 concurrent disk agents can be used per a tape drive; and
(2) maxTput=80 MB/s, i.e., the aggregate throughput of the assigned concurrent objects per a tape drive should not exceed 80 MB/s.

Figure 6:
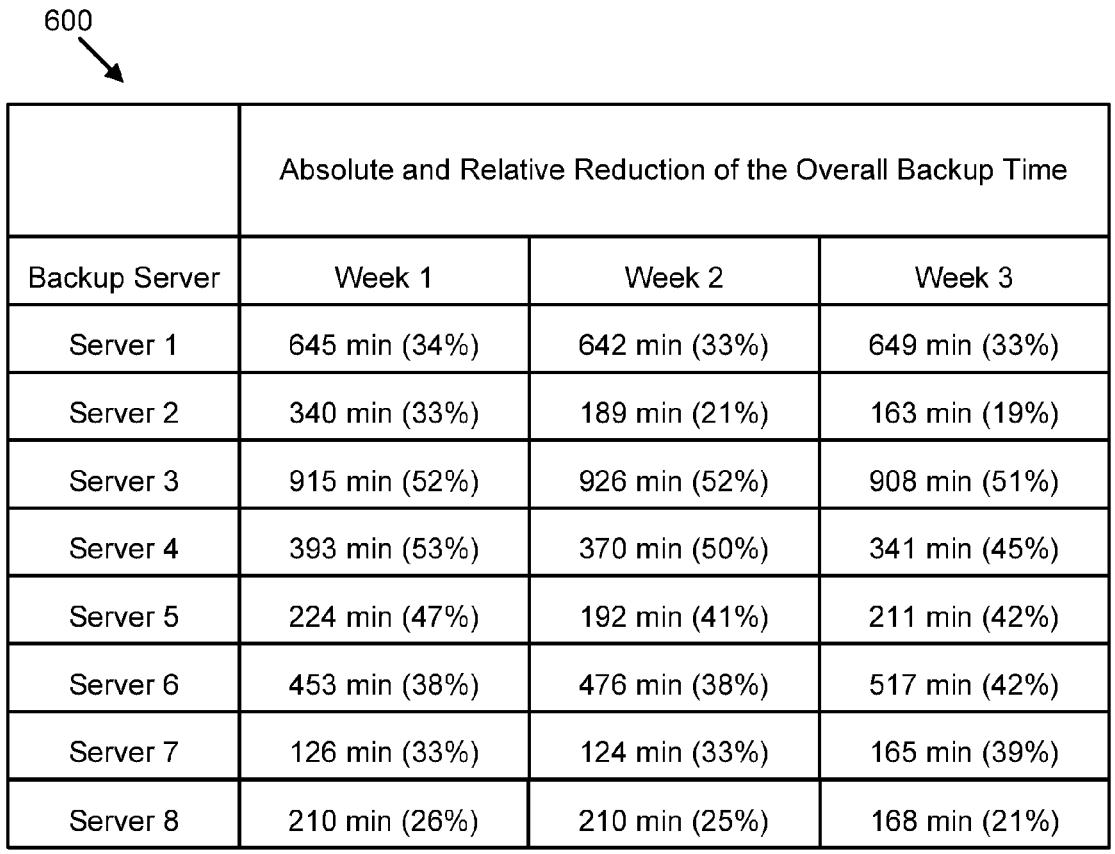
FIG. 6 shows a table depicting reduction in backup times when a FlexLBF algorithm is used to backup data in accordance with an example embodiment.

FIG. 6 shows a table 600 with the absolute and relative reduction in the overall backup times when the FlexLBF scheduling algorithm is used instead of LBF.

Under FlexLBF scheduling, each job is characterized by its duration and its throughput (observed from the past measurements). The additional information on job throughput is used to dynamically regulate or change the number of concurrent disk agents that are used for processing to optimize the tape drive throughput.

Table 600 shows further significant reduction in the overall backup times across all the eight servers: from 124 min to 926 min (which translates in 21%-53% relative backup time reduction).

Changing the number of concurrent DAs under the FlexLBF scheduler provides a significant advantage for optimizing both backup processing time and the tape drive resource usage.

In one embodiment, the FlexLBF scheduling algorithm has two parameters: (i) maxDA which is the limit on the maximum number of concurrent DAs per a tape drive); and (ii) maxTput which is the limit on the aggregate throughput of the assigned concurrent objects per a drive (e.g., defined by the tape drive specification). Different settings of maxDA impact the performance results for a given workload. For a given workload and a specified value of maxTput, the impact of different values of maxDA can be large. At the same time, typically, there is a limited range of useful values for maxDA, i.e., values that have a positive performance impact. Often, a higher value of concurrent DAs might not result in a better performance. This scenario is true in the cases when the overall backup time is limited by the duration of the longest job, and hence cannot be further improved. In these situations, using a higher number of concurrent disk agents might lead to excessive data interleaving on the tape without any additional performance benefits.

Example embodiments enable a system administrator to simulate backups and analyze the potentials of their backup infrastructure and its available capacity before the infrastructure needs to be scaled up and a new capacity added. Example embodiments include a set of simulation and analysis routines to identify the range of useful parameter settings and the minimal backup server configuration for processing a given workload.

Figure 7:
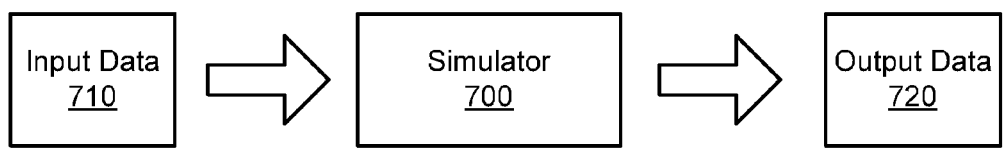
FIG. 7 shows inputs and outputs to a simulator in accordance with an example embodiment.

FIG. 7 shows a simulator 700 in accordance with an example embodiment. The simulator receives input data 710, processes the input data, and provides output data 720.

In one example embodiment, the system administrator provides one or more of the following inputs 710 to the simulator:
(1) a given workload, i.e., a set of objects for backup processing with their historical information on object durations and throughputs;
(2) a default backup server configuration with the number of tape drives NumDrives available in the configuration;
(3) maxTput: the maximum throughput of the tape drives; and
(4) maxDA: the maximum number of disk agents that can be used concurrently during backup processing. This number reflects the comfort level of an acceptable data interleaving on the tape that the system administrator is ready to accept. The tool minimizes this number to avoid excessive interleaving if the specified maxDA does not provide additional performance benefits.

Based on the initial inputs from the system administrator, the simulator will produce one or more of the following outputs 720:
(1) the minimal number of tape drives required for processing a given workload;
(2) the optimized number of maxDA for FlexLBF; and
(3) the estimated overall backup time.

Figure 8A:
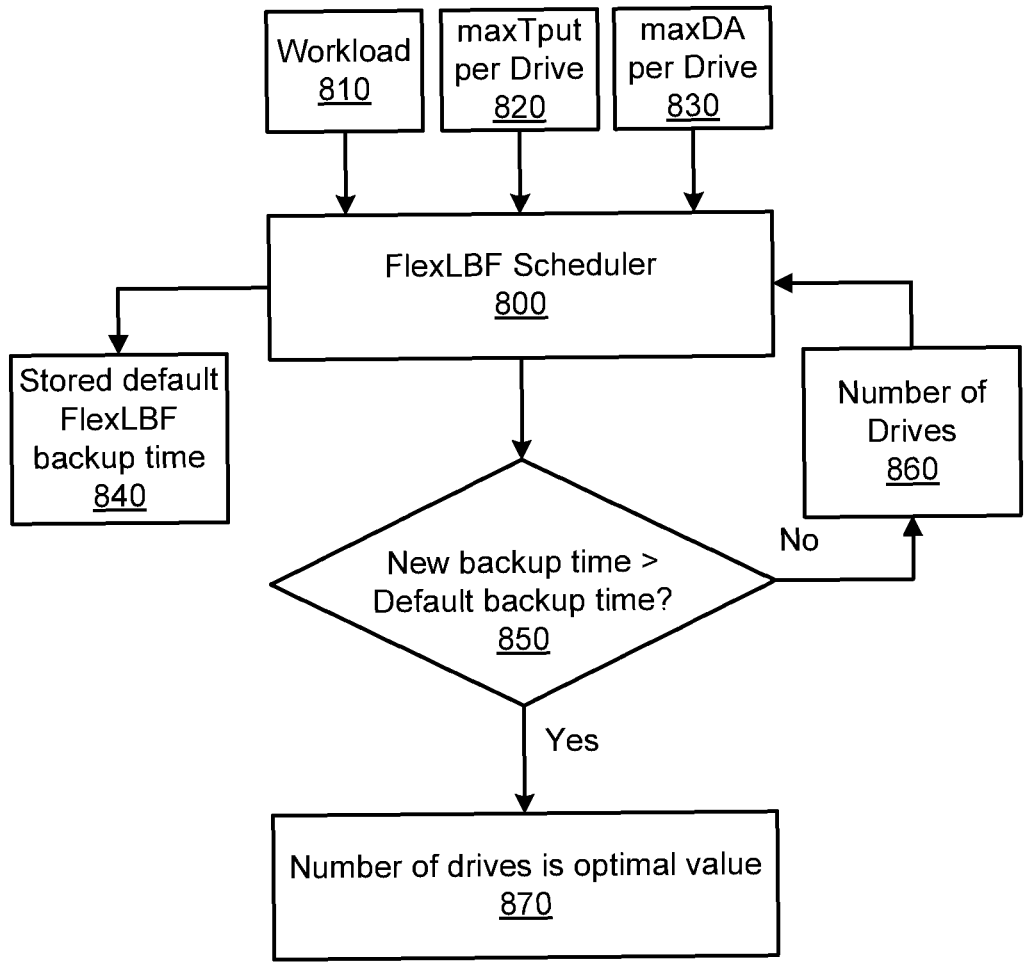
FIG. 8A shows a flow diagram to minimize a number of drives to backup data in accordance with an example embodiment.
Figure 8B:
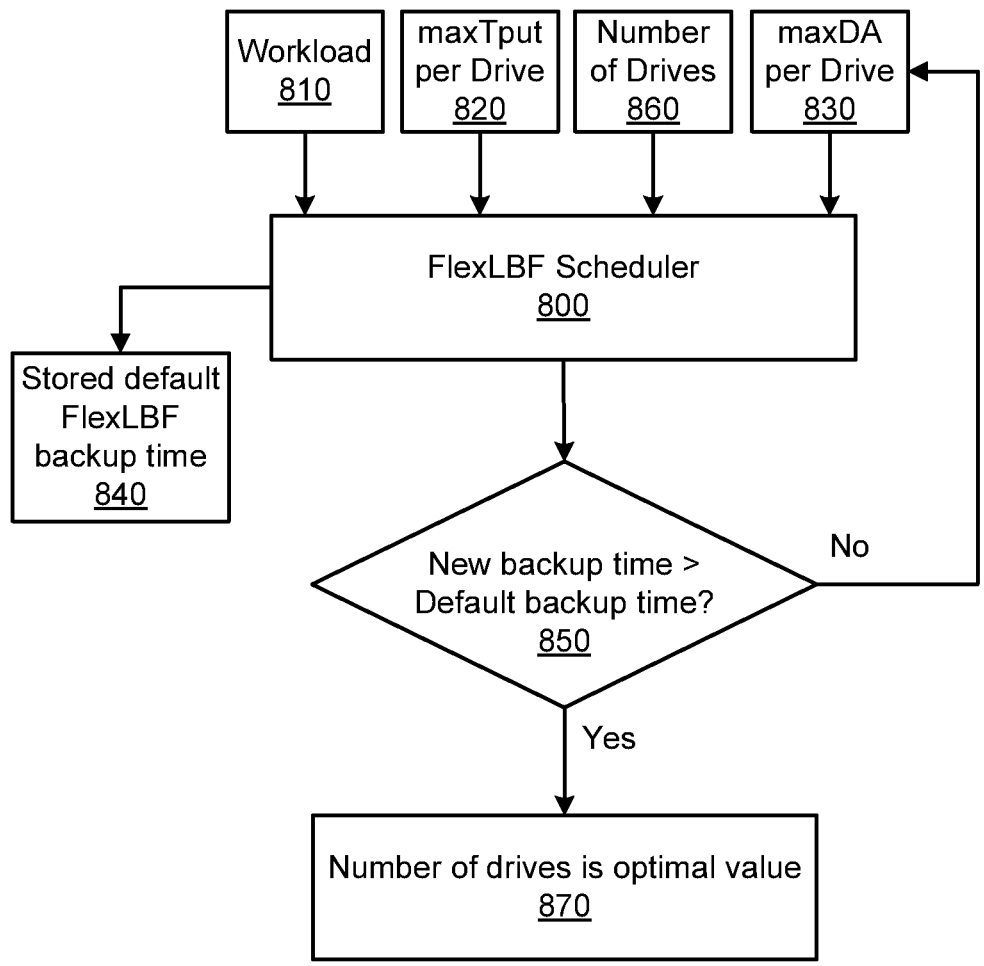
FIG. 8B shows a flow diagram to optimize a number of drives to backup data in accordance with an example embodiment.

The analysis consists of a first simulation routine (shown in FIG. 8A) and a second simulation routine (shown in FIG. 8B).

The first simulation routine shown in FIG. 8A includes a FlexLBF scheduler 800 that receives workload input 810, maxTput per drive 820, and maxDA per drive 830. The FlexLBF stores the default FlexLBF backup time 840.

According to block 850, a determination is made as to whether a new backup time is greater than a default backup time. If the answer to this determination is "no" then the number of drives (NumDrives) is less than or equal to (≤) the number of drives minus one (NumDrives−1). This value (NumDrives) 860 is fed into the FlexLBF scheduler 800. If the answer to this determination is "yes" then the number of drives (NumDrives) is known and stored as an optimal value 870.

During the first simulation routine (shown in FIG. 8A), example embodiments simulate the achievable backup processing time under the FlexLBF algorithm with the default number of tape drives and the specified (by the administrator) number of maxDA. This simulated time is called the default FlexLBF backup time and it is used as a reference for the best achievable backup time in the full configuration specified by the system administrator.

The simulation cycle is repeated for estimating the backup processing time under a decreased number of tape drives in the system. The simulation stops once a decreased number of tape drives leads to a worse system performance, i.e., an increased backup processing time for a given workload compared to the stored default backup time. In such a way, one embodiment first determines the minimal number of tape drives required for a given workload under the FlexLBF scheduler 800 and specified input parameters of maxTput 820 and maxDA 830.

The second simulation routine shown in FIG. 8B includes a FlexLBF scheduler 800 that receives workload input 810, maxTput per drive 820, maxDA per drive 830, and number of drives (NumDrives) 860. The FlexLBF scheduler 800 stores the default FlexLBF backup time 840.

According to block 850, a determination is made as to whether a new backup time is greater than a default backup time. If the answer to this determination is "no" then the maxDA is less than or equal to (≤) the maxDA minus 1 (maxDA maxDA−1). This value is stored as the maxDA per drive 830. If the answer to this determination is "yes" then the maxDA per drive (maxDA) is known and stored as an optimal value 870.

During the second simulation routine (shown in FIG. 8B), example embodiments simulate the achievable backup processing time with the FlexLBF scheduler under a decreased number of maxDA. The simulation stops once a decreased number of maxDA leads to a worse system performance, i.e., when it results in the increased backup processing time for a given workload compared to the stored default backup time.

FIG. 9 shows a table 900 with the tuned configuration parameters across eight backup servers with the tape drive target rate of maxTput=80 MB/s. For example, for Server 1 and Server 8 the simulator shows that the optimal backup time can be achieved with two tape drives each configured with maxDA=4. Workloads at Server 3 and Server 6 can be handled with the optimal backup time in the configuration with two tape drives and maxDA=5.

For remaining four servers in the study (Server 2, Server 4, Server 5, and Server 7), their workloads are processed with a single tape drive, and each of these servers uses a different number of active disk agents. While Server 2 would benefit from all the 10 concurrent disk agents, Server 7 would achieve the optimal backup time with 7 concurrent disk agents. If we would set maxDA to 10 for Server 7, it will introduce excessive data interleaving with no additional performance benefits. The outlined framework aims to automate parameter tuning and to avoid the potential inefficiencies.

The proposed simulation framework can also be used for achieving a slightly different performance objective set by a system administrator. For example, suppose a system administrator desires to complete the backup in time T (where T might be longer than the optimal time). Then the question for the simulation framework is: What should be a minimum required configuration under the FlexLBF (or LBF) scheduler to process a given workload within time T? The proposed simulation framework is suited to answer this question.

In the second half of table 900 shows the configurations across eight backup servers for handling their workloads within 15% of the optimal backup time. In many cases, there is a significant reduction in the required resources when the backup window requirements are relaxed. Only Server 6 still uses two tape drives for handling its workload. The remaining servers satisfy the backup time specifications with a single tape drive and different maxDA configurations in a range from 5 to 9 as shown in Table 900.

Additionally, the proposed simulator can be used for understanding the outcome of different scenarios. For example, the system administrator might be interested in estimating the outcome of possible changes to the system. Often, there are different generations of tape libraries that co-exist for backup processing. Typically, they have different throughput characteristics (e.g., a current generation tape libraries might have two times higher throughput than a previous generation). The system administrator might evaluate potential benefits/drawbacks of moving a particular set of objects for processing by a different tape library.

Thus example embodiments provide FlexLBF job scheduling with a changing number of active disk agents for optimizing run-time backup performance. The introduced framework provides a tunable knob to system administrators for achieving multiple quality of service (QoS) objectives, improves resource usage, reduces backup latency, and optimizes data restore time. Moreover, the set of simulation and analysis routines avoid manual configuration and planning efforts by system administrators. The proposed framework automates the backup server configuration and parameter tuning for processing a given workload and helps to achieve nearly optimal performance.

Figure 10:
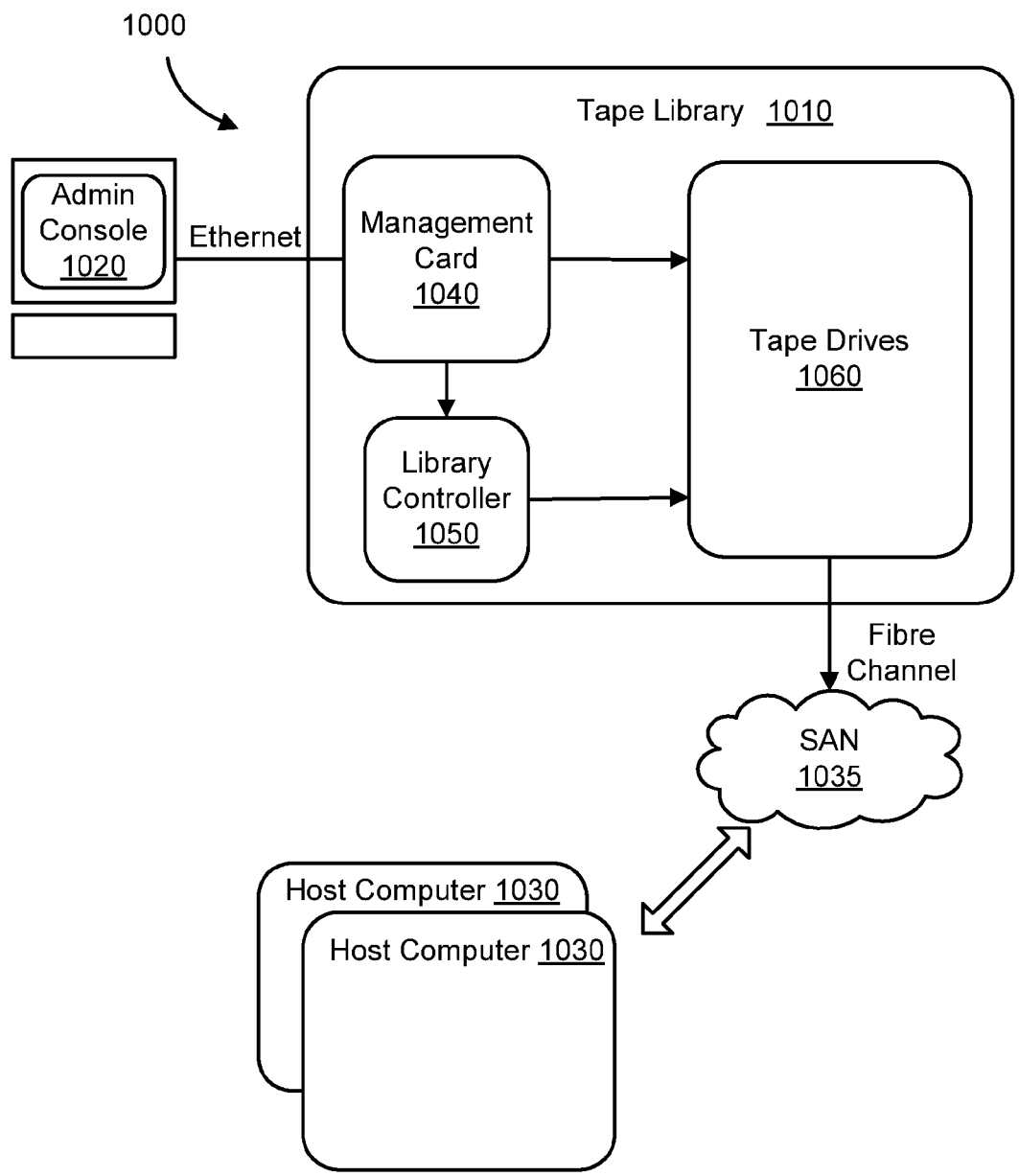
FIG. 10 shows an exemplary storage system in accordance with an example embodiment.

FIG. 10 is an exemplary storage system 1000 in accordance with an example embodiment. The storage system includes a tape library 1010 connected to an administrative console 1020 and one or more host computers 1030 via one or more networks (for example, shown as a storage area network 1035 or SAN).

The tape library 1010 includes a management card 1040 coupled to a library controller 1050 and one or more tape drives 1060. In one embodiment, the administrative console 1020 enables a user or administrator to select and/or administer backup of data according to example embodiments discussed herein. The library controller is used to execute one or more methods and/or algorithms according to example embodiments discussed herein.

Embodiments in accordance with the present invention are utilized in a variety of systems, methods, and apparatus. For illustration, example embodiments are discussed in connection with a tape library. Example embodiments, however, are applicable to other types of storage systems, such as storage devices using cartridges, hard disk drives, optical disks, or movable media. Furthermore, method disclosed herein can be executed by a processor, a controller, a server, a storage device, a computer, or other type of computing device.

DEFINITIONS

As used herein and in the claims, the following words are defined as follows:

The term "storage device" means any data storage device capable of storing data including, but not limited to, one or more of a disk array, a disk drive, a tape drive, optical drive, a SCSI device, or a fiber channel device. Further, a "disk array" or "array" is a storage system that includes plural disk drives, a cache, and controller. Arrays include, but are not limited to, networked attached storage (NAS) arrays, modular SAN arrays, monolithic SAN arrays, utility SAN arrays, and storage virtualization.

In one example embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with example embodiments are provided as examples and should not be construed to limit other embodiments within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing example embodiments. Such specific information is not provided to limit example embodiments.

In some example embodiments, the methods illustrated herein and data and instructions associated therewith are stored in respective storage devices, which are implemented as one or more computer-readable or computer-usable storage media or mediums. The storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; and optical media such as Compact Disks (CDs) or Digital Versatile Disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

Example embodiments are implemented as a method, system, and/or apparatus. As one example, example embodiments and steps associated therewith are implemented as one or more computer software programs to implement the methods described herein. The software is implemented as one or more modules (also referred to as code subroutines, or "objects" in object-oriented programming). The software programming code, for example, is accessed by a processor or processors of the computer or server from long-term storage media of some type, such as a CD-ROM drive or hard drive. The software programming code is embodied or stored on any of a variety of known physical and tangible media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles of various example embodiments. Numerous variations and modifications will become apparent to those skilled in the art once the above disclosure is fully appreciated. It is intended that the following claims be interpreted to embrace all such variations and modifications.

What is claimed is:

1. A method executed by a computer, comprising:
   executing a first simulation to determine a first backup time to backup objects to storage devices using a first number of concurrent disk agents that are assigned to each of the storage devices;
   changing the first number of concurrent disk agents to a second number of concurrent disk agents;
   executing a second simulation to determine a second backup time to backup the objects to the storage devices using the second number of concurrent disk agents that are assigned to each of the storage devices; and
   backing up the objects to the storage device with the second number of concurrent disk agents when the second backup time is less than the first backup time,
   determining a maximum number of concurrent disk agents that can be assigned to each of the storage devices.

2. A method executed by a computer, comprising:
   executing a first simulation to determine a first backup time to backup objects to storage devices using a first number of concurrent disk agents that are assigned to each of the storage devices;
   changing the first number of concurrent disk agents to a second number of concurrent disk agents;
   executing a second simulation to determine a second backup time to backup the objects to the storage devices using the second number of concurrent disk agents that are assigned to each of the storage devices; and
   backing up the objects to the storage device with the second number of concurrent disk agents when the second backup time is less than the first backup time,
   repeating a cycle that changes the number of concurrent disk agents and then simulates backing up the objects to the storage device until a simulation generates an increase in backup processing time for the objects.

3. A method executed by a computer, comprising:
   executing a first simulation to determine a first backup time to backup objects to storage devices using a first number of concurrent disk agents that are assigned to each of the storage devices;
   changing the first number of concurrent disk agents to a second number of concurrent disk agents;
   executing a second simulation to determine a second backup time to backup the objects to the storage devices using the second number of concurrent disk agents that are assigned to each of the storage devices; and
   backing up the objects to the storage device with the second number of concurrent disk agents when the second backup time is less than the first backup time,
   determining a maximum aggregate throughput of the objects at each of the storage devices.

4. A method executed by a computer, comprising:
   executing a first simulation to determine a first backup time to backup objects to storage devices using a first number of concurrent disk agents that are assigned to each of the storage devices;
   changing the first number of concurrent disk agents to a second number of concurrent disk agents;
   executing a second simulation to determine a second backup time to backup the objects to the storage devices using the second number of concurrent disk agents that are assigned to each of the storage devices; and
   backing up the objects to the storage device with the second number of concurrent disk agents when the second backup time is less than the first backup time,
   wherein the storage device is a tape library and the multiples drives are tape drives in the tape library.

5. A method executed by a computer, comprising:
   executing a first simulation to determine a first backup time to backup objects to storage devices using a first number of concurrent disk agents that are assigned to each of the storage devices;
   changing the first number of concurrent disk agents to a second number of concurrent disk agents;
   executing a second simulation to determine a second backup time to backup the objects to the storage devices using the second number of concurrent disk agents that are assigned to each of the storage devices; and
   backing up the objects to the storage device with the second number of concurrent disk agents when the second backup time is less than the first backup time,
   assigning the objects to a tape drive if a job does not violate a maximum aggregate throughput specified for the tape drive.

6. A method executed by a computer, comprising:
   executing a first simulation to determine a first backup time to backup objects to storage devices using a first number of concurrent disk agents that are assigned to each of the storage devices;
   changing the first number of concurrent disk agents to a second number of concurrent disk agents;
   executing a second simulation to determine a second backup time to backup the objects to the storage devices using the second number of concurrent disk agents that are assigned to each of the storage devices; and
   backing up the objects to the storage device with the second number of concurrent disk agents when the second backup time is less than the first backup time,
   determining a minimal number of tape drives required to process the objects.

7. A method executed by a computer, comprising:
executing a first simulation to determine a first backup time to backup objects to storage devices using a first number of concurrent disk agents that are assigned to each of the storage devices;
changing the first number of concurrent disk agents to a second number of concurrent disk agents;
executing a second simulation to determine a second backup time to backup the objects to the storage devices using the second number of concurrent disk agents that are assigned to each of the storage devices; and
backing up the objects to the storage device with the second number of concurrent disk agents when the second backup time is less than the first backup time,
determining a minimal number of tape drives to backup the objects given a maximum number of concurrent disk agents that can be assigned per tape and a maximum aggregate throughput of the objects at each tape drive.

8. A non-transitory tangible computer readable storage medium storing instructions for causing a computer to execute a method, comprising:
obtaining, from historic data, times to previously backup filesystems to storage devices;
ordering, based on the times, the filesystems according to a schedule that backs up a filesystem having a longer previous backup time before a filesystem having a shorter previous backup time;
backing up the filesystems to the storage device with an assigned number of disk agents for each of the storage devices; and
decreasing a time to backup the filesystems by changing, during the backup of the filesystems, the number of the disk agents assigned for each of the storage devices.

9. The non-transitory tangible computer readable storage medium of claim 8 further comprising: assigning the filesystems to the disk agents that backup the filesystems to tape drives in the storage device; and backing up the filesystems with the disk agents to the tape drives according to the schedule.

10. The non-transitory tangible computer readable storage medium of claim 8 further comprising, repeating a simulation of a backup of the filesystems until an increase backup processing time occurs for a simulation compared to a stored default backup processing time.

11. The non-transitory tangible computer readable storage medium of claim 8 further comprising: determining a maximum number of concurrent disk agents that can be assigned for each of the storage devices; and determining a maximum aggregate throughput at each of the storage devices.

12. The non-transitory tangible computer readable storage medium of claim 8, wherein the storage device is a tape library and the drives are tape drives in the tape library.

13. A tape library, comprising:
a plurality of tape drives; and
a controller that controls the tape drives to backup filesystems with an assigned number of active disk agents for each of the tape drives, wherein the assigned number of active disk agents for each of the tape drives changes during the backup of the filesystems to decrease an overall time to backup the filesystem.

14. The tape library of claim 13, wherein the assigned number of active disk agents is determined through an analysis of historical data that includes job durations to backup the filesystems to the tape drives and job throughput at the tape drives.

15. The tape library of claim 13, wherein a simulation is repeatedly executed on the tape library to determine a maximum number of agents to backup the filesystems without increasing a duration of time during the backup.

16. The tape library of claim 13, wherein an object is assigned to one of the tape drives if assignment of the object to the one of the tape drives does not violate a maximum aggregate throughput specified for the one of the tape drives.

17. The tape library of claim 13, wherein the controller determines a minimal number of tape drives for backing up the filesystems.

18. The tape library of claim 13, wherein the controller simulates backing up of the filesystems with a default number of tape drives specified by an administrator.

19. The tape library of claim 13, wherein a schedule orders the filesystems according to a list that backs up a filesystem having a longer previous backup time before a filesystem having a shorter previous backup time, and assigns the filesystems to agents that backup the filesystems to the tape drives according to the list.

* * * * *